(12) United States Patent
Yamada et al.

(10) Patent No.: US 7,115,807 B2
(45) Date of Patent: Oct. 3, 2006

(54) INFORMATION PROCESSING UNIT, DISPLAY METHOD FOR THE INFORMATION PROCESSING UNIT, PROGRAM FOR THE SAME, RECORDING MEDIUM FOR RECORDING THE PROGRAM THEREIN AND REPRODUCING UNIT

(75) Inventors: Youichi Yamada, Tokorozawa (JP); Hiroyuki Isobe, Tokorozawa (JP); Tomohiko Kumura, Tokorozawa (JP); Koichiro Sakata, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 181 days.

(21) Appl. No.: 10/645,850

(22) Filed: Aug. 22, 2003

(65) Prior Publication Data
US 2004/0085291 A1   May 6, 2004

(30) Foreign Application Priority Data
Aug. 23, 2002   (JP)   ............................. 2002-244165

(51) Int. Cl.
*G10H 7/00*   (2006.01)
(52) U.S. Cl. ....................................... 84/602; 711/100
(58) Field of Classification Search .................. 84/601, 84/602, 604–609; 711/100; 365/203.01; 369/30.7, 30.04, 30.26
See application file for complete search history.

(56) References Cited

U.S. PATENT DOCUMENTS

| | | | |
|---|---|---|---|
| 4,812,940 A | 3/1989 | Takenaga | .................... 360/137 |
| 5,701,282 A * | 12/1997 | Matsumoto et al. | ..... 369/30.04 |
| 5,832,173 A | 11/1998 | Terasawa et al. | ............. 386/69 |
| 2002/0012526 A1 | 1/2002 | Sai et al. | ...................... 386/69 |
| 2002/0101790 A1* | 8/2002 | Miyashita et al. | ........ 369/30.07 |
| 2002/0172107 A1* | 11/2002 | Yamada et al. | .......... 369/30.26 |

FOREIGN PATENT DOCUMENTS

| | | |
|---|---|---|
| EP | 0 535 732 | 4/1993 |
| EP | 0 844 614 | 5/1998 |
| EP | 1 229 544 | 8/2002 |
| EP | 1 260 987 | 11/2002 |

OTHER PUBLICATIONS

European Search Report dated Oct. 13, 2004.

\* cited by examiner

*Primary Examiner*—Marlon T. Fletcher
*Assistant Examiner*—Jianchun Qin
(74) *Attorney, Agent, or Firm*—Armstrong, Kratz, Quintos, Hanson & Brooks, LLP

(57) ABSTRACT

A reading section (10) reads information recorded in an optical disk and outputs a read signal. A DSP (20) detects the read signal, and make it reproducible. An operational instruction recognizing section (51) recognizes an instruction for a specified position of the information. Then a display control section (54) makes a cue point position display section of a display section (130) display an instructed position. Because of this feature, the specified instructed position can be recognized easily and accurately.

16 Claims, 7 Drawing Sheets

INFORMATION PROCESSING UNIT, DISPLAY METHOD FOR THE INFORMATION PROCESSING UNIT, PROGRAM FOR THE SAME, RECORDING MEDIUM FOR RECORDING THE PROGRAM THEREIN AND REPRODUCING UNIT

BACKGROUND OF THE INVENTION

1. Field of the Invention

The present invention relates to an information processing unit capable of displaying a processing state of information, a display method for the information processing unit, a program for the same, a recording medium for recording therein the program, and a reproducing unit.

2. Description of Related Art

There has been known a method for playing music in which a player called disk jockey (DJ) plays music such as dance music using a record player as a reproducing unit.

The disk jockey plays dance music or the like by controlling, with his or her hand, rotation of a phonerecord turning on a turn table to start or stop replay of a music piece, replay the same phrase in repetition and jump to a position from which replay should be started.

In the repetitive reproduction or in reproduction by jumping to a desired reproducing position, a tape or the like is adhered to a specified position on a label surface of a record disk as a marker. During reproduction, the disk jockey visually monitors this marker and carries out repetitive reproduction or reproduction from a desired position by controlling rotation of the record disk with his or her hand to match a position of a needle for reproduction with a position of this marker.

In the case where a tape or the like is adhered on a label surface of a record disk to use it as a marker as described above, since the marker rotates in association with rotation of the record disk, it is difficult to recognize the marker's position.

Especially, when there are a plurality of markers, it is difficult to recognize the relative positions of the markers, which makes it difficult to recognize a desired marker when it is tried to carry out repetitive reproduction or reproduction from the desired position based on a particular one among the markers.

SUMMARY OF THE INVENTION

A main object of the present invention is to provide an information processing unit capable of accurately recognizing an instructed position; a display method for the information processing unit, a program for the same, a recording medium for recording therein the program, and a reproducing unit.

The information processing unit according to the present invention comprises a reading section for reading information recorded in a recording medium; an information processing section for processing the information read by the reading section; a positional instruction recognizing section for recognizing an instruction for a prespecified position of said information; and a display section for displaying, when a positional instruction is recognized by the positional instruction recognizing section, the instructed position corresponding to the instructed information.

The display method for the information processing unit according to the present invention is developed from the information processing unit according to the present invention described above, and comprises the steps of reading and processing information recorded in a recording medium, recognizing an instruction for a prespecified position of said information, and displaying an instructed position corresponding to the instructed information.

The display program for the information processing unit according to the present invention is developed from the information processing unit according to the present invention described above, and makes a computing section execute the display method for the information processing unit according to the present invention.

The recording medium for recording therein the display program for the information processing unit according to the present invention records therein the display program for the information processing unit according to the present invention described above so that the program can be read by the computing section.

The reproducing unit according to the present invention comprises the information processing unit according to the present invention and a reproducing unit for fetching and reproducing information processed by the information processing unit.

DETAILED DESCRIPTION OF PREFERRED EMBODIMENT(S)

An embodiment of the present invention is described with reference to the drawings hereunder.

[Configuration of the Reproducing Unit]

Figure 1:
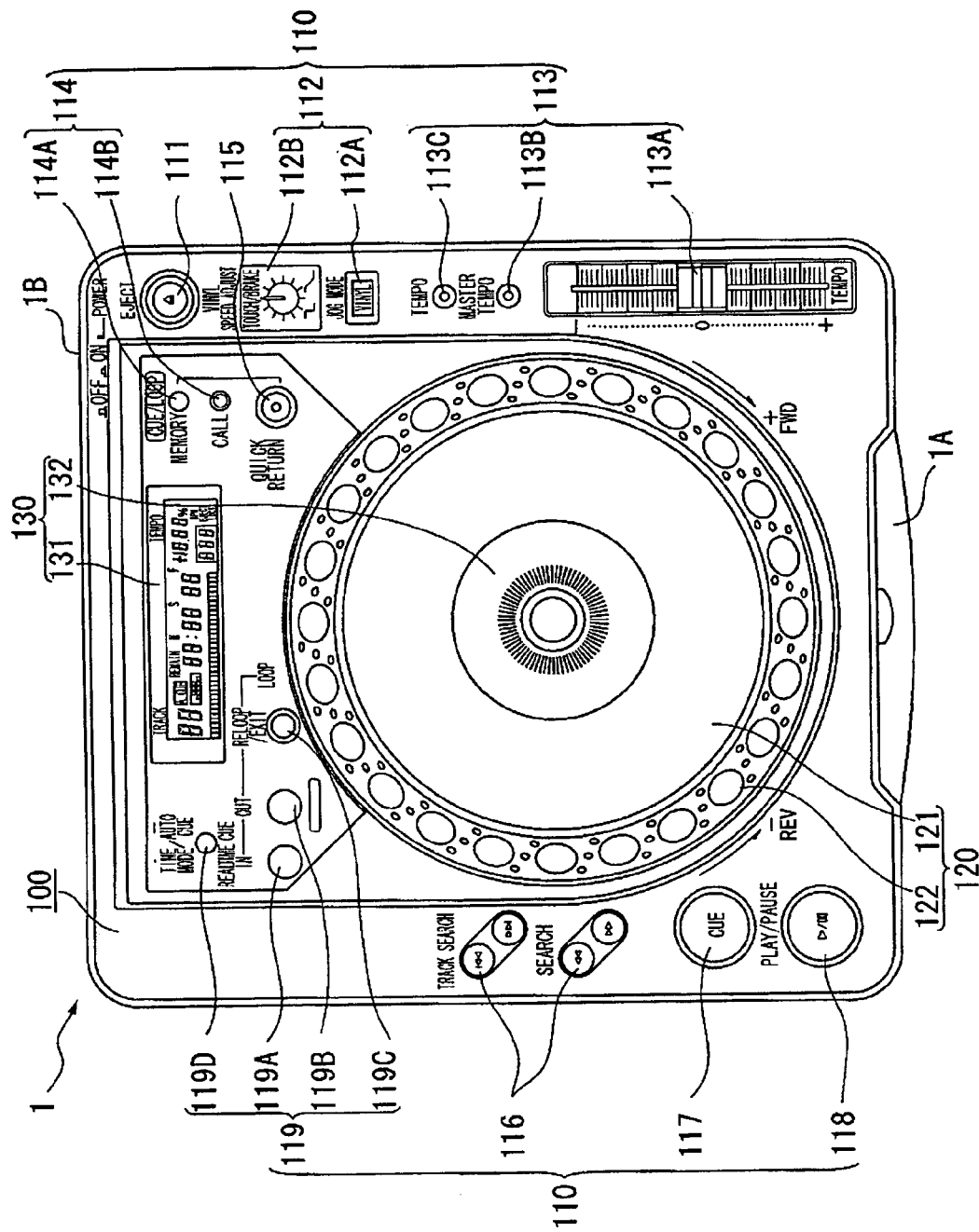
FIG. 1 is a flat view an information reproducing unit as an reproducing unit according to an embodiment of the present invention.

FIG. 1 is a flat view showing an information reproducing unit according to the present invention. In FIG. 1, designated at the reference numeral 1 an information reproducing unit and at 100 an operating panel which is used for manipulation of the information reproducing unit 1 by a user and the like. This information reproducing unit 1 has a substantially cubic form and fetches data recorded in a recording medium such as CD or DVD (optical disk) to replay. This information reproducing unit 1, as shown in FIG. 1, has a loading slot 1A to insert an optical disk at one side thereof (FIG. 1, bottom at the center) On the other side of the loading slot 1A (FIG. 1. top at the center), a power button 1B is equipped in order to switch on or off the information reproducing unit 1.

Although not illustrated specifically, when the user and the like inserts the optical disk into the loading slot 1A, an auto-loading mechanism would be activated. The optical disk is then delivered to a prespecified clump position by this auto-loading mechanism to be loaded into a hub section in a driving shaft of a spindle motor. In this state, by operating the operating panel 100, the spindle motor starts to rotate in a prespecified direction while a pick-up of a reading section 10 described hereinafter reads the data to be reproduced recorded in the optical disk. The read reproduced data is processed to output as the sounds.

By operating the operating panel 100, the auto-loading mechanism becomes unloading state, so that the optical disk in the clamp position is delivered to outside of the loading slot 1A.

The operating panel 100 comprises the operational instruction section 110 which recognizes the operation done by the user to send an operation signal to a control section 50 described hereinafter; the reproducing state changing section 120 as a change instruction recognizing section which outputs an operation signal for changing the reproducing state to a control section 50 described hereinafter; and a display section 130 which displays the reproducing state in the information reproducing unit 1.

The operational instruction section 110 comprises various types of operating buttons. The operating buttons include, as main ones, an eject button 111, a mode adjusting section 112, a tempo adjusting section 113, a cue/loop button 114, a quick return button 115, a search button 116, a cue button 117, a replay/stop button 118, and a loop operating section 119.

Of these, the mode adjusting section 112 comprises a jog mode button 112A which switches the operation mode of the information reproducing unit 1, and a speed adjusting section 112B which raises or reduces the replaying speed at the time of starting or stopping of replaying when the jog mode button 112A is turned ON.

The jog mode button 112A switches the reproducing mode by a touch sensor 121 of the reproducing state changing section 120 described hereinafter. When the jog mode button 112A is pressed down (ON state), an operation signal indicating that operations of the information reproducing unit 1 with the touch sensor 121 are enabled is outputted. When the jog mode button 112A is OFF, an operation signal indicating that operations of the information reproducing unit 1 with the touch sensor 121 is inhibited is outputted.

The speed adjusting section 112B is rotatably provided so that the start-up speed for reproduction and the reduction speed in the reproduction stopping step can be changed when a rotating operation is performed by the user or the like.

The tempo adjusting section 113 variably sets the tempo of the reproduced sounds. This tempo adjusting section 113 is provided so that it can move up and down, and comprises a temp adjusting control 113A which variably sets the reproduced sound tempo within a prespecified range; a master tempo button 113B which variably sets the speed of the reproduced sounds without changing the tone thereof; and a tempo range switching button 113C which variably sets the range of the tempo adjusting control 113A.

A cue/loop button 114 is connected, for instance, to an external recording medium such as a memory card, and outputs operation signals according to the instructions for recording data at a cue point or at a loop point for each optical disk when the user pressed the button. Because of this configuration, the cue/loop button 114 has a memory button 114A which outputs the operation signals based on the instruction for recording data at the cue point or the loop point for each optical disk, and a call button 114B which selects either the cue point or the loop point for each optical disk reproduced in the external recording medium.

The quick return button 115 selects the processing details for changing the reproducing state in the reproducing state changing section 120. For instance, the quick return button 115 selects at least either one of the processing followings; termination/start of the processing for reproduced data, and change of a reproduction position for reproduced data.

In this embodiment, the quick return button 115 selects the processing details as described hereunder. The following description assumes the case where the aforesaid jog mode button 112A is ON.

When the quick return button 115 is OFF, the quick return button 115 selects the processing for terminating or starting reproduction of data. Namely an operator stops or starts reproduction of data by pressing or touching the touch sensor 121 of the reproducing state changing section 120 described hereinafter.

While the quick return button 115 is ON, the quick return button 115 selects the processing for changing the reproducing position to a cue point. Namely, the player moves the reproducing position of data to the cue point by pressing or touching the touch sensor 121 of the reproducing state changing section 120 described hereinafter.

The aforesaid jog mode button 112A and the quick return button 115 set both of the processing for changing a reproducing position of the reproduced data backward and forward (details are described hereinafter), and the processing for changing a reproducing position of the reproduced data to the cue point described hereinafter.

In this embodiment, the jog mode button 112A and the quick return button 115 set the processing details as follows.

When both of the jog mode button 112A and the quick return button 115 are ON, they set both of the aforesaid processing details for changing the reproducing position to the cue point, and the processing details for changing the processing position of the reproduced data backward and forward. Namely, they set both the processing details for changing a reproducing position of the reproduced data and also the processing details for moving the processing position of the reproduced data forward or backward according to an operating range detected in an angular speed detecting element 120A of the reproducing state changing section 120 described hereinafter. More specifically, the player moves the reproducing position of the reproduced data to the cue point by pressing or touching the touch sensor 121 of the reproducing state changing section 120 described hereinafter. Furthermore, when the player performs the rotating operation at the touch sensor 121 while pressing or touching the touch sensor 121, the angular speed detecting element 120A detects the operating range, and then the backward and forward movement of the reproducing position of the reproduced data is carried out according to the operating range.

When either the jog mode button 112A or the quick return button 115 is OFF, the aforesaid processing details for changing the reproducing position of the reproduced data to the cue point, and the processing details for changing the reproducing position of the reproduced data backward and forward are not set.

The cue button 117 is mainly used to register a cue point as a prespecified position and outputs an operation signal based on the instructions for the prespecified cut point when this cue button 117 is pressed down by the user during temporary stop of an optical disk.

The loop operating section 119 repeatedly reproduces the reproduced data and comprises a loop in/real time cue button 119A, a loop out/out adjust button 119B, a re-loop/exit button 119C, and a time-mode/auto-cue switch button 119D.

The loop in/real time cue button 119A outputs an operation signal based on the instructions for the starting point during the repeated reproduction when the button 119A is pressed down by the user while the reproduced data is reproduced.

The loop out/out adjust button 119B outputs an operation signal based on the instructions for the ending point during the repeated reproduction when the button 119B is pressed down by the user operation while the reproduced data is reproduced.

The re-loop/exit button 119C outputs an operation signal based on the instruction for repeated reproduction of the reproduced data within the period instructed with the loop in/real time cue button 119A and the loop out/out adjust button 119B when the button 119C is pressed by the user.

The time-mode/auto-cue switch button 119D automatically sets to skip mute parts at the starting position of the reproduced data when the button 119D is ON.

The reproducing state changing section 120 is rotatably provided at a substantially central position of the operating panel 100, has a substantially disk-like form, and variably sets the reproducing state when obtaining and reproducing the reproduced data recorded in the optical disk. The reproducing state changing section 120 comprises the touch sensor 121 and a jog dial circumference section 122. The reproducing state changing section 120 also comprises the angular speed detecting element 120A (FIG. 3) for detecting an operating range (a rotating direction, a rotating speed and number of rotations) by the rotating operation.

The touch sensor 121 is provided inside of the reproducing state changing section 120 and has a substantially plate-shaped form. The touch sensor 121 detects whether it is touched or pressed by the user and the like. For instance, the touch sensor 121 comprises a sheet-formed pressure sensor. When the touch sensor 121 is pressed or touched, the touch sensor 121 recognizes an instruction for changing the reproducing state of the optical disk and outputs an operation signal.

The jog dial circumference section 122 is provided at the circumference of the reproducing state changing section 120 and has a substantially plate-shaped form. The jog dial circumference section 122 has multiple concave portions to help execution of the rotating operation.

The reproducing state changing section 120 recognizes the instruction for changing the reproducing state of the optical disk and outputs an operation signal by detecting that the touch sensor 121 is touched or pressed, or that the touch sensor 121 or the jog dial circumference section 122 is rotated.

The display section 130 comprises a reproducing information display section 131 for displaying various information regarding the reproduced data, and a reproducing state display section 132 for displaying the reproducing state of the reproduced data under the control of the control section 50 described hereinafter.

The reproducing information display section 131 comprises a color liquid crystal display unit having a substantially rectangular form and provides prespecified displays under the control of the control section 50 described hereinafter. For instance, the reproducing information display section 131 displays the reproduction time frame of the reproduced data during the reproduction, a title of the reproduced piece, a track number of the reproduced piece, and a tempo of the entire reproduced piece.

Figure 2:
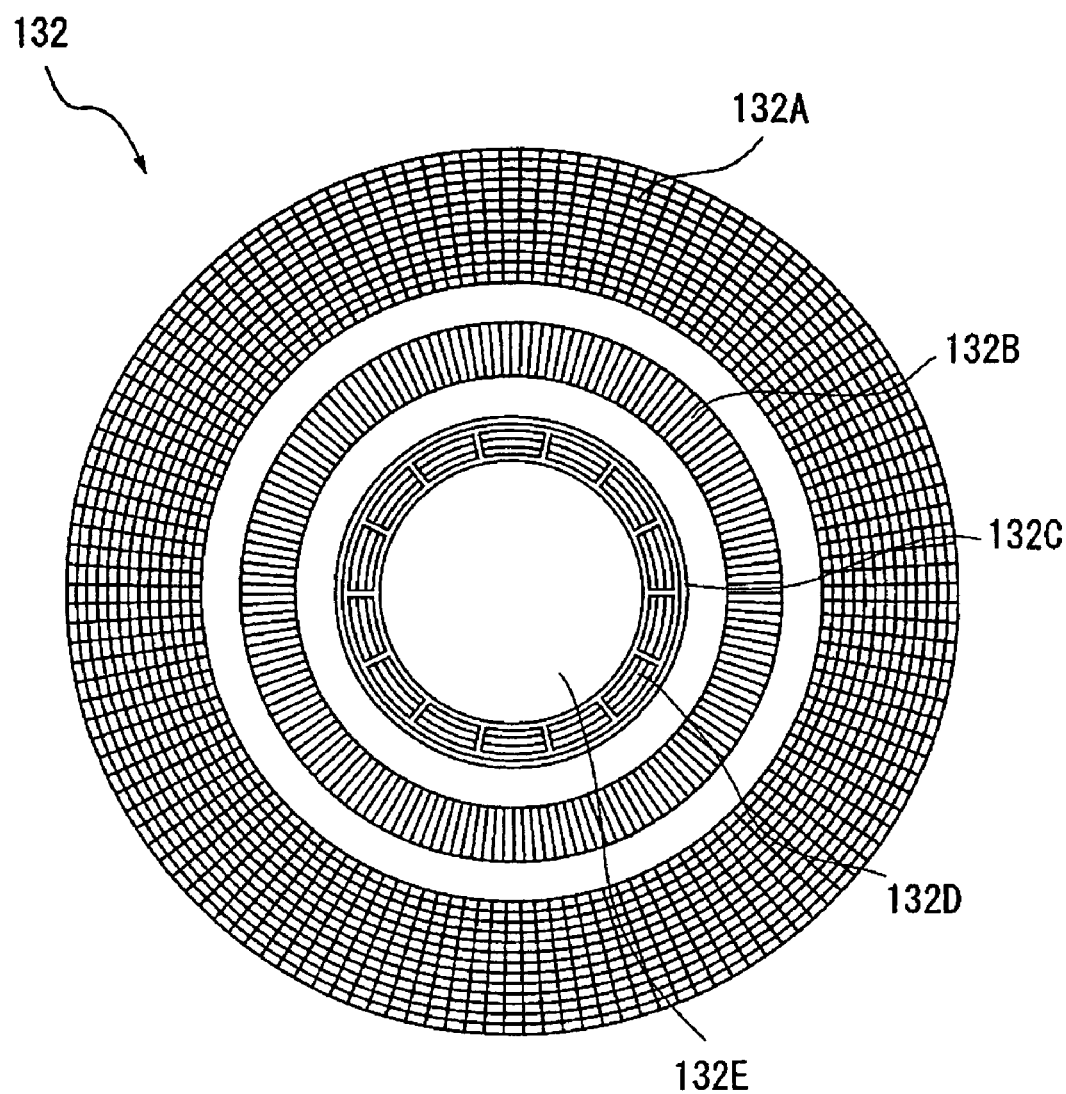
FIG. 2 is a view showing general configuration of a reproducing state display section of a display section in the embodiment.

The reproducing state display section 132 locates inside of the touch sensor 121 belonging to the reproducing state changing section 120 and displays the reproducing state of the reproduced data. FIG. 2 shows the general configurations of the reproducing state display section 132. The reproducing state display section 132 comprises, as shown in FIG. 2, a disk-shaped color liquid crystal displays. The reproducing state display section 132 comprises a reproducing position display section 132A, a cue point position display section 132B, a sound memory display section 132C, a jog touch detecting display section 132D and a mode display section 132E.

The reproducing position display section 132A is provided at the circumference area of the reproducing state display section 132 and slender fan-shaped light emitting elements are arrayed along a circular virtual orbit. The reproducing position display section 132A displays a reproducing position of an optical disk by lightening the light emitting elements in correspondence to a rotating speed of the analog record. The reproducing position repeatedly moves along with the circular virtual orbit at the same speed as that of an analog record which generally rotates 33 times per minute. Therefore, also the reproducing position repeatedly rotates at the rotating speed of 60/33 seconds per one rotation.

The cue point position display section 132B is provided inside the reproducing position display section 132A and the slender fan-shaped light emitting elements are arrayed along a circular virtual orbit thereof like in the reproducing position display section 132A. The cue point position display section 132B displays the cue point position when the cue button 117 of the aforesaid operational instruction section 110 is pressed down by the user.

The sound memory display section 132C displays by blinking, when the read data is defective due to scratches or the like in the optical disk and a volume of the data recorded in the ring memory 41 of the recording section 40 described hereinafter becomes smaller as compared to a prespecified level, the defective state.

The mode display section 132E has a substantially disk-shaped form and is provided at the center of the reproducing state display section 132, and provides displays when the operation mode in the mode adjusting section 112 of the operational instruction section 110 is the jog mode.

The jog touch detecting display section 132D is provided at the circumference area of the mode display section 132E and wide fan-shaped light emitting elements are arrayed in a circular form. The jog touch detecting display section 132D provides specified displays when the touch sensor 121 of the reproducing state changing section 120 is pressed or touched with a prespecified pressure by the user and the like.

[Control Structure of the Information Reproducing Unit]

Figure 3:
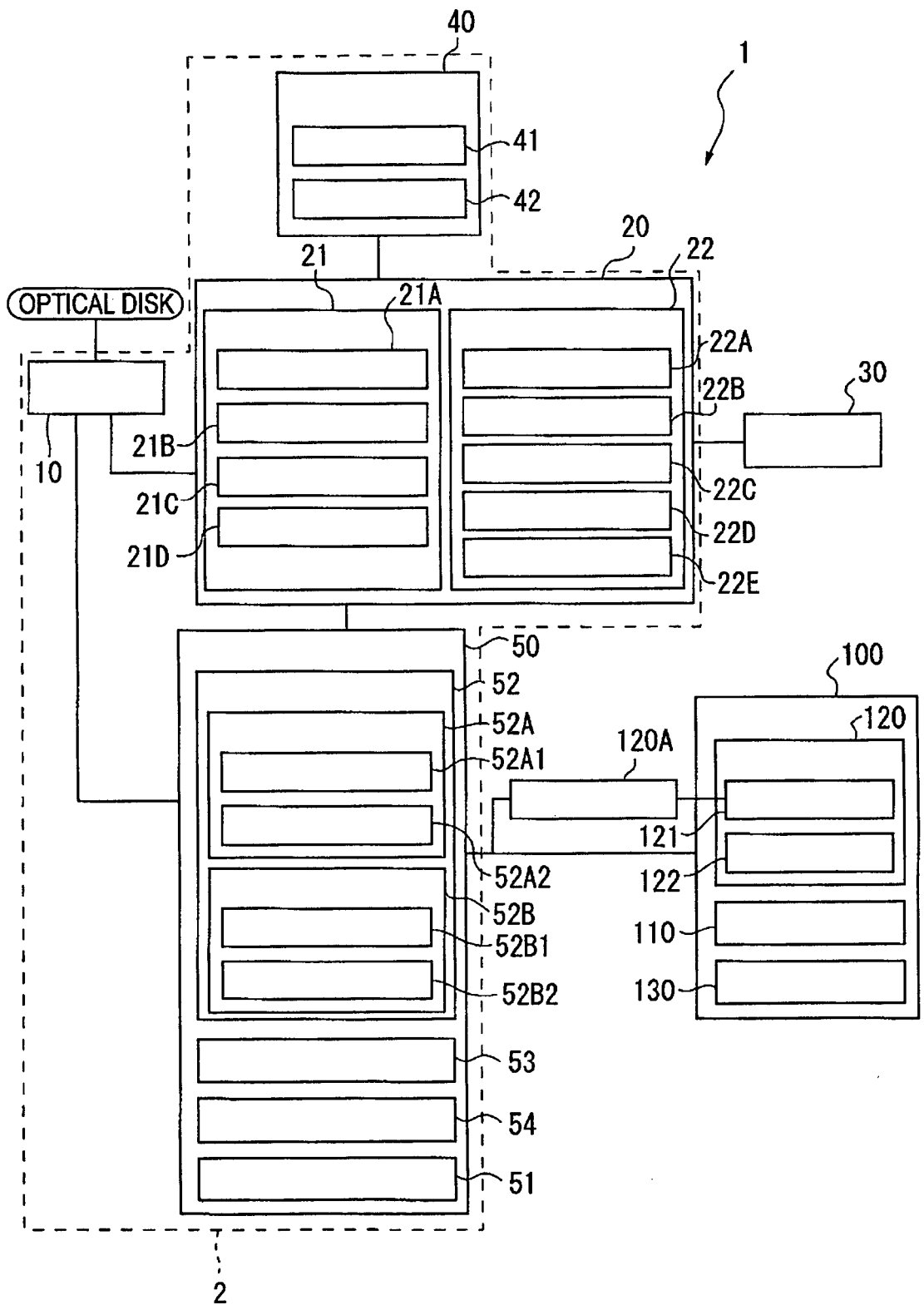
FIG. 3 is a block diagram showing control structure of the information reprocucing unit in the embodiment.

Control structure of the information reproducing unit 1 is now described hereunder. FIG. 3 is a block diagram illustrating the control structure of the information reproducing unit 1. The information reproducing unit 1 comprises, as shown in FIG. 3, the operating panel 100 as described above, a reading section 10, a DSP (Digital Signal Processor) 20 as an information processing section, a reproducing section 30, a recording section 40, and a control section 50. The reading section 10, DSP 20, the control section 50, reproducing state display section 120 of the operating panel 100 forms the information processing unit 2 according to the present invention.

The reproduced data recorded with a prespecified format and sub-code data as positional information relating to a position of the reproduced data thereof are recorded in the optical disk.

The reading section 10 is loaded through a loading slot 1A under the control of the control section 50 to read the data recorded in the optical disk loaded at a prespecified position and execute predefined decoding processing. The decoded data is sent to the DSP 20.

Although not shown in the figure, this reading section 10 comprises a spindle motor for rotating the optical disk in a prespecified direction, a pick-up for outputting an operation signal by optically reading data recorded in the optical disk, a servo mechanism for reciprocally moving the pick-up in the radial direction of the optical disk to read the data, and a decoding section for subjecting a read signal outputted from the pick-up to prespecified processing for decoding to output a data signal.

The DSP 20 receives the data signal outputted from the reading section 10 to produce pack data comprising sub-code data and reproduced data correlated to each other. The DSP 20 outputs the pack data to the recording section 40. The DSP 20 reads out, under the control of the control section 50, the pack data recorded in the recording section 40 and processes so that the data can be reproduced according to the necessity. The DSP 20 comprises a data input section 21 which receives a data signal and writes the data in the recording section 40, and a data output section 22 which reads out data recorded in the recording section 40 and outputs the data.

The data input section 21 comprises an input buffer circuit 21A; a pack data producing section 21B; a data write section 21C; and a write address controller 21D.

The input buffer circuit 21A receives the data signals outputted from the reading section 10 and outputs the data to the pack data producing section 21B.

Figure 4A:
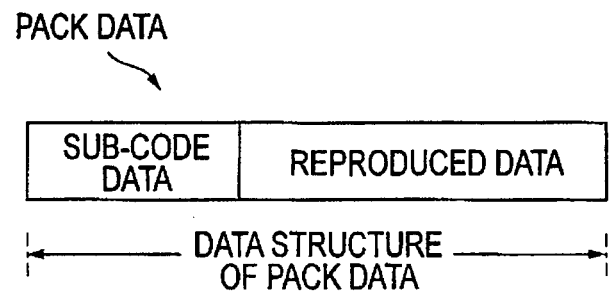
FIG. 4A, FIG. 4B, and FIG. 4C are views each showing configuration of a ring memory of a recording section in the embodiment.

The pack data producing section 21B produces, as shown in the FIG. 4A, the pack data comprising sub-code data and reproduced data corresponding to the sub-code data from the data fetched from the input buffer circuit 21A. Namely the pack data producing section detects information indicating a passed tracking time for the reproduced data and correlates the reproduced data corresponding to the detected information with the sub-code data to produce the pack data. The produced pack data is sent to the data write section 21C.

The write address controller 21D receives a control signal from the control section 50 and sets a write address of the recording section 40 corresponding to the control signal. The write address controller 21D comprises the write data address controller for a ring memory not shown for setting a write address in the ring memory 41 of the recording section 40, and a data address controller for the cue memory not shown for setting a white address of the cue memory 42 in the recording section 40 described hereafter.

The data write section 21C writes, based on the write address set by the write address controller 21D, the pack data fetched from the pack data producing section 21B into the corresponding address in the recording section 40.

The data output section 22 comprises a read address controller 22E, a data read section 22D, a pack data separating section 22C, an output speed adjusting section 22B and an output buffer circuit 22A.

The read address controller 22E receives a control signal from the control section 50 and sets the write address of the recording section 40 corresponding to the aforesaid control signal. The read address controller 22E sets, like the write address controller 21D, write addresses of the ring memory 41 and the cue memory 42 described hereafter in the recording section 40 based on the control signal from the control section 50.

The data read section 22D reads out the pack data from the corresponding address in the recording section 40 based on the read address set in the read address controller 22E. This readout pack data is sent to the pack data separating section 22C.

The pack data separating section 22C fetches the pack data read out in the data read section 22D and divides the pack data into reproduced data and sub-code data. The pack data separating section 22C outputs the reproduced data to the output speed adjusting section 22B and also outputs the sub-code data to the control section 50.

The output speed adjusting section 22B adjusts the output speed of the reproduced data read out as described above in correspondence to a control signal from the control section 50. For instance, the output speed adjusting section 22B adjusts the output speed of the reproduced data by receiving a control signal corresponding to the rotational speed from the control section 50 when the reproducing state changing section 120 of the operating panel 100 is rotated. The output speed adjusting section 112B also adjusts the start-up speed for data reproduction and speed reduction rate in the step of terminating the reduction by receiving a control signal corresponding to an adjustment rate set in the speed adjustment section 112B of the operating panel 100 from the control section 50.

The output buffer circuit 22A fetches the reproduced data according to the output speed adjusted by the output speed adjusting section 22B. The output buffer circuit 22A outputs the fetched reproduced data to the reproducing section 30.

The reproducing section 30 outputs the reproduced data outputted from the DSP 20 as voices and sounds. For instance, the reproducing section 30 may comprise a DAC (Digital Analog Converter) for subjecting the reproduced data outputted from the DSP 20 to digital/analog conversion and outputting the converted data as a sound signal, an amplifier (AMP) for amplifying the sound signal from the DAC, and a speaker for outputting the sound signal amplified by the AMP as voices and sounds.

The recording section 40 comprises, for instance, a SDRAM and records the pack data outputted from the data write section 21C of the DSP 20. The recording section 40 comprises a ring memory 41 and a cue memory.

Figure 4B:
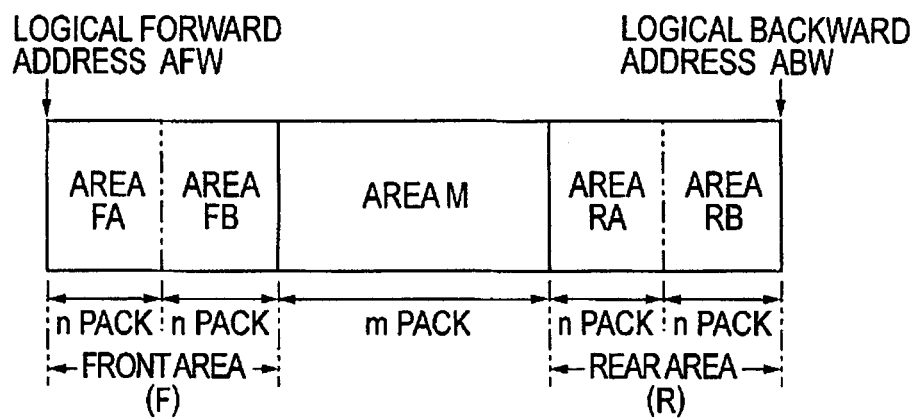

In the ring memory 41, as shown in the FIG. 4B, a front area F and main memory area M are arranged in the data storage area from the logical forward address AFW to the logical backward address ABW.

The front area F consists of two sub-areas FA and FB each storing a pieces of pack data therein respectively. Also the rear area R consists of two sub-areas RA and RB each storing therein n pieces of pack data respectively as in the front area F. The main memory area M has a storage capacity enough to store a prespecified number of pack data therein.

Figure 4C:
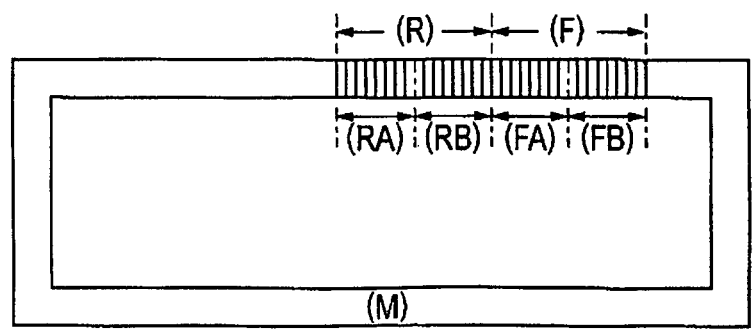

The ring memory 41 is based on a substantially ring-shaped logical structure realized by linking adjoining front area F and rear area R with the main memory area M by treating the logical forward address AFW and the logical backward address ABW as an endless one in which the former is linked to the latter as shown in FIG. 4C.

The cue memory 42 records the pack data (FIG. 4A) corresponding to the cue points in response to an operation signal generated when the user presses the cue button 117 of the operational instruction section 110. More specifically, the cue memory 42 records the pack data corresponding to the cue point and those present in front of and at the back of the aforesaid pack data. Herein it is defined that the front is the direction toward the logical forward address AFW and the back is the direction toward the logical backward address ABW when viewed from a particular address in the ring memory 41.

The control section 50 controls operations of the entire information reproducing unit 1. The control section 50 comprises a CPU (Central Processing Unit), reads a control program stored in a ROM or the like not shown, and executes the program. The control section 50 outputs control signals to each component of the information reproducing unit 1 and also outputs or receives data. Although not shown in the figures, the control section 50 comprises a CPU, a ROM, a RAM, I/O devices and a bus line connecting the components to each other. The control section 50 is electrically connected, as shown in FIG. 3, to each component of the operating panel 100, and controls the DSP20, the reading section 10, and the display section 130 of the operating panel 100 according to operation signals sent from each of the components. The control section 50 comprises an operational instruction recognizing section 51, a reproduction control section 52, a read control section 53, and a display control section 54.

The operational instruction recognizing section 51 detects an operation signal outputted from the reproducing state changing section 120 as well as from the operational instruction section 110 of the operating panel 100 and recognizes operational instructions corresponding to the operation signals. The operational instruction recognizing section 51 outputs signals corresponding to the operational instructions to each component of the control section 50.

For instance, the operational instruction recognizing section 51 recognizes the operational instructions as follows.

When the operational instruction recognizing section 51 detects an operation signal outputted from the reproducing state changing section 120, the operational instruction recognizing section 51 recognizes the operational instruction based on the state (ON or OFF) of the jog mode button 112A and the quick return button 115 in the operational instruction section 110.

More specifically, when both of the jog mode button 112A and the quick return button 115 are OFF, the operational instruction recognizing section 51 recognizes the state as an operational instruction for changing the reproduction speed when reproducing the reproduced data based on an operating range detected by the angular speed detecting element 120A of the reproducing state changing section 120.

When the jog mode button 112A is ON and the quick return button 115 is OFF, the operational instruction recognizing section 51 recognizes the state as an operational instruction for stopping or starting the processing for the data reproduction.

When the operational instruction recognizing section 51 recognizes the operating range detected by the angular speed detecting element 120A of the reproducing state changing section 120, the operational instruction recognizing section 51 recognizes the state as an operational instruction for moving the reproducing position of the reproduced data forward or backward according to the operating range.

When the jog mode button 112A is ON and the quick return button 115 is ON, the operational instruction recognizing section 51 recognizes the state as an operational instruction for reading out the pack data recorded in the cue memory 42.

When the operational instruction recognizing section 51 recognizes the operating range detected by the angular speed detecting element 120A of the reproducing state changing section 120, the operational instruction recognizing section 51 recognizes the state as an operational instruction for moving the reproducing position (the cue point) of the reproduced data backward or forward.

When the operational instruction recognizing section 51 detects an operation signal outputted from the cue button 117 of the operational instruction section 110, the operational instruction recognizing section 51 recognizes it as an operational instruction for registering the cue point. Namely, the operational instruction recognizing section 51 corresponds to the positional instruction recognizing section in the present invention.

The reproduction control section 52 controls operations of the DSP 20 to execute the processing for reproducing the data recorded in the optical disk. The reproduction control section 52 comprises a data write control section 52A and a data read control section 52B.

The data write control section 52A controls a writing volume when writing the pack data from the DSP 20 in the recording section 40 with a program stored in a ROM or the like not shown in the figure, or in response to an output signal from the operational instruction recognizing section 51. The data write control section 52A comprises a ring memory write control section 52A1 and a cue memory write control section 52A2.

The ring memory write control section 52A1 outputs a control signal corresponding to a write address in a write address controller 21D of the DSP 20. The write address controller 21D sets a prespecified write address, and the data write section 21C outputs, based on the set write address, the produced pack data to the ring memory 41 of the recording section 40.

The cue memory write control section 52A2 sets a cue point according to an output signal from the operational instruction recognizing section 51 and outputs a control signal corresponding to the cue point to the write address controller 21D of DSP20. The write address controller 21D sets a prespecified write address, and the data write section 21C outputs, based on the set write address, the pack data corresponding to the cue point to the cue memory 42 of the recording section 40. The cue memory write control section 52A2 outputs a control signal so that also the pack data in front of and at the back of the pack data corresponding to the cue point are outputted to the cue memory 42.

The data read control section 52B outputs a control signal, based on a program recorded in the ROM and the like not shown in the figure, or in response to an output signal from the operational instruction recognizing section 51, to the DSP 20. The data read control section 52B comprises a ring memory read control section 52B1 for making DSP20 read out the pack data from a prespecified address in the ring memory 41, and the cue memory read control section 52B2 for making the DSP20 read out the pack data from a prespecified address in the cue memory 42.

For example, the data read control section 52B fetches, as output signals from the operational instruction recognizing section 52, an output signal for changing the reproduction speed, an output signal for stopping or starting reproduction of the reproduced data, an output signal for moving the reproducing position of the reproduced data forward or backward, an output signal for reading out the pack data recorded in the cue memory 42, and an output signal for registering a cue point.

When the ring memory read control section 52B1 receives an output signal for changing the reproduction speed from the operational instruction recognizing section 51, the ring memory read control section 52B1 outputs a control signal to the output speed adjusting section 22B of the DSP 20 in response to the operating range (rotating direction, rotating speed, and number of rotations) detected by the angular speed detecting element 120A of the reproducing state changing section 120. The output speed adjusting section 22B adjusts the reproducing speed according to the control signal.

Namely, when the jog mode button 112A is OFF and the quick return button 115 is OFF, if a rotating operation of the reproducing state changing section 120 is carried out by the user the like, a change occurs in the tone of the sounds reproduced by the speaker or the head phone in response to the rotating speed. When the jog dial circumference section 122 is rotated, the reproduction speed is changed according to the rotating speed regardless of the state of the jog mode button 112 and the quick return button 115.

The output signal for changing the reduction speed is generated not only according to the rotating operation of the reproducing state changing section 120, but also to acceleration of deceleration of the reproduction speed set in the speed adjusting section 112B. In this case, the data read control section 52B outputs a control signal to the output speed adjusting section 22B of DSP20. The output speed adjusting section 22B adjusts the start-up speed of reproduction and a speed reduction rate in termination of the reproduction in response to the control signal.

When the ring memory read control section 52B1 fetches an output signal for stopping or starting the processing of the reproduced data from the operational instruction recognizing section 51, the output buffer circuit 22a outputs a control signal. Then the output buffer circuit 22A stops or starts output of the reproduction data in response to the control signal.

When the jog mode button 112A is ON and the quick return button 115 is OFF, if the touch sensor 121 is pressed or touched by the user during the reproduction of the data, the reproduction of the reproduced data is stopped. When the pressing down or the touching operation is released, the reproduction of the reproduced data is restarted. Reproduction of reproduced data can also be stopped or restarted also by operating the reproduce/stop button 118.

When the ring memory read control section 52B1 receives from the operational instruction recognizing section 51 an output signal for moving the reproducing position of the reproduced data forward or backward, the ring memory read control section 52B1 outputs a control signal to the read address controller 22E of DSP 20 according to an operating range (rotating direction, rotating speed and number of rotations) detected by the angular speed detecting element 120A of the reproducing state changing section 120. The data read section 22D of the DSP 20 reads out, based on the read address set in the read address controller 22E, the pack data recorded in the ring memory 41, and the reproduced data is subjected to forward reproduction or reverse reproduction.

When the touch sensor 121 is rotated while the touch sensor 121 is pressed or touched and reproduction of the reproduced data is stopped, the reproducing position of the reproduced data is changed forward or backward according to an operating range (rotating direction, rotating speed, and a number of rotations). For instance, when the touch sensor 121 is rotated in the regular direction or in the reverse direction, the reproducing direction is switched between the forward direction and the reverse direction, and the so-called scratch sounds (like "bang" or "squeak") are generated.

When the cue memory read control section 52B2 fetches an output signal for reading out the pack data recorded in the cue memory 42 from the operational instruction recognizing section 51, the cue memory read control section 52B2 outputs a control signal corresponding to the read address to the read address controller 22E. The read address controller 22E then sets the read address corresponding to the controls signal. The data read section 22D reads out the pack data from the address corresponding to the cue memory 42 based on the read address set in the read address controller 22E.

Namely when the jog mode button is ON and also the quick return button is ON with the reproduction of the reproduced data stopped, if the touch sensor 121 is pressed down or touched by the user, the reproducing position of the reproduced data is changed to the cue point.

When the cue memory read control section 52B2 fetches from the operational instruction recognizing section 51 an output signal for changing the reproducing position of the reproduced data forward or backward, the cue memory read control section 52B2 carries out forward reproduction or reverse reproduction according to an operating range (an operating direction, an operating speed or a number of rotations) detected by the angular speed detecting element 120A of the reproducing state changing section 120. Namely the pack data in front of and at the back of the cue point is read out and reproduced from the cue memory 42.

The read control section 53 controls operations of the reading section 10 so that the recorded information is read by the reading section 10 from an appropriate position of the optical disk. Further the reading section 10 detects a data volume of the pack data recorded in the ring memory 41 of the recording section 40, and outputs a control signal to the reading section 10 to update the pack data when a data volume of the pack data becomes smaller. Namely, when the reading section 10 receives the control signal, the reading section 10 reads out data for updating from the optical disk by moving the pick-up. After the prespecified decode processing is carried out, the reading section 10 outputs the read data to the reproducing section 30 to generate new pack data and have the pack data stored in the ring memory 41.

Further, when the pack data read is read out by the cue memory read control section 52B2 of the data read control section 52B, the read control section 53 controls the reading section 10 so that information near the cue point is read out from the optical disk.

The display control section 54 fetches sub-code data which successively outputted from the pack data separating section 22C of the DSP 20, and make the display section 130 display the sub-code data in a prespecified format. In particular, as the display control, the reproducing state display section 132 in the display section 130 executes the prespecified processing for computing based on the fetched sub-code data to calculate the reproducing position to provide displays at prespecified positions of the reproducing position display section 132A and the cue point position display section 132B based on the reproducing position data.

Namely the reproducing state display section 132 of the display section 130 and the display control section 54 forms the display section according to the present invention.

[Operations of the Information Reproducing Unit]

Figure 5:
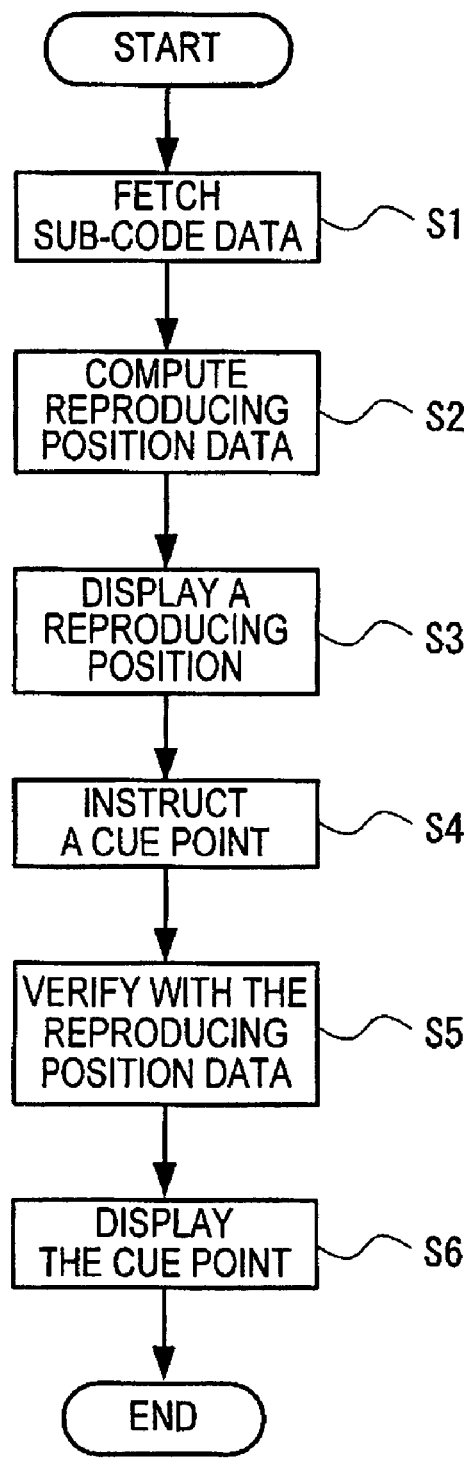
FIG. 5 is a flow chart illustrating operations for displaying a reproducing position and a cue point in the information reproducing unit in the embodiment.
Figure 6:
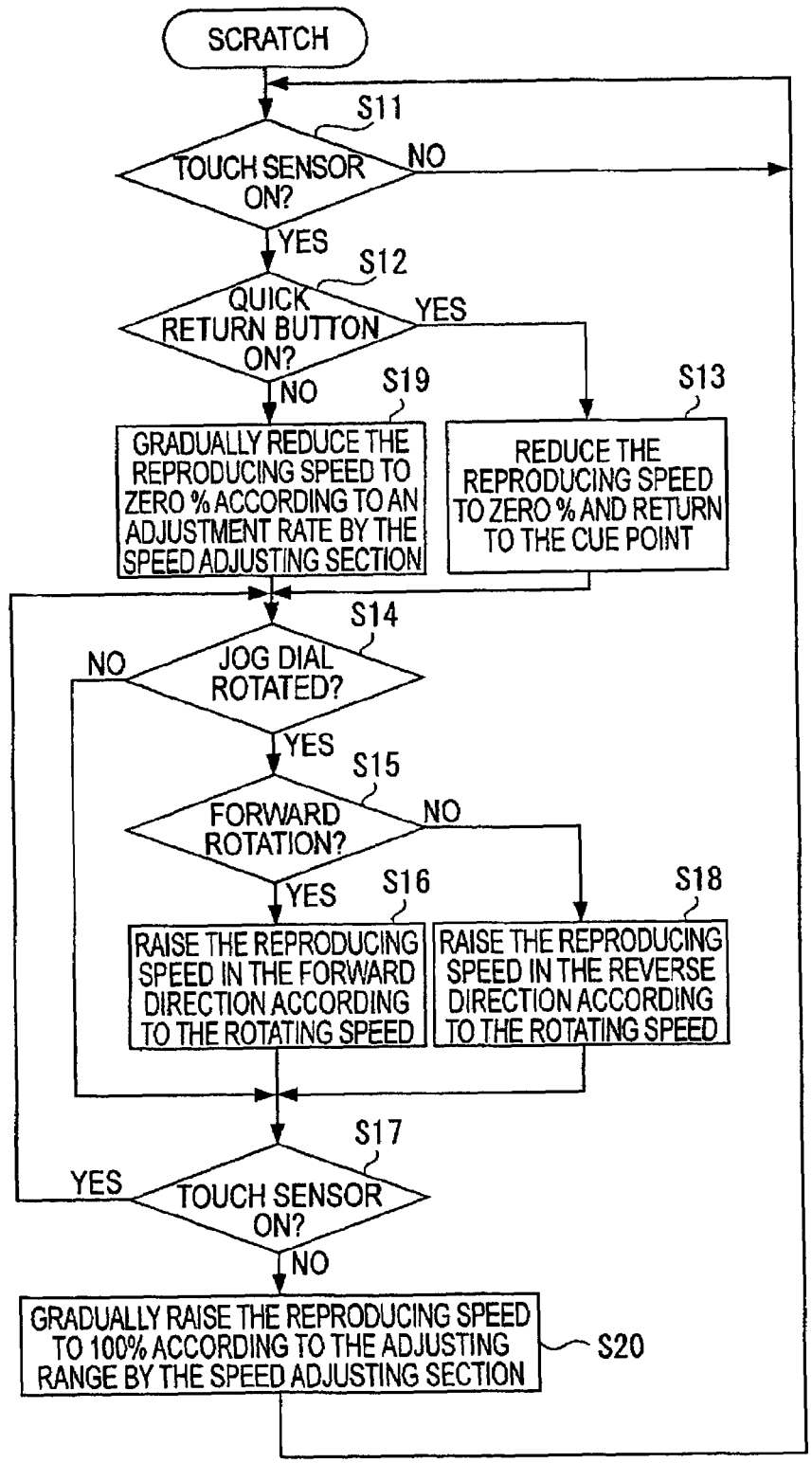
FIG. 6 is a flow chart illustrating operations for changing the reproducing state of the information reproducing unit in the embodiment.

Operations of the information reproducing unit 1 are now explained with reference to FIG. 5 and FIG. 6. FIG. 5 is a flow chart illustrating operations for displaying a reproducing position and a cue point in the information reproducing unit 1. FIG. 6 is a flow chart illustrating operations of the information reproducing unit 1 for changing the reproducing state. Description is made, in relation to FIG. 6, for the playing method, as a specific example, in which the reproducing position is returned to the cue point during reproduction and scratching is performed at the cue point. Also the case is assumed that the jog mode button 112A is ON.

The scratching is performed by repeatedly switching the reproducing direction between the forward direction and the reverse direction to generate the so-called scratch sounds (like "bang" or "squeak").

At first, the operations of the information reproducing unit 1 for displaying a reproducing position and a cue point are explained with reference to FIG. 1, FIG. 3 and the flow chart shown in FIG. 5.

When the reading section 10 reads out the data recorded in the optical disk and outputs a data signal to the DSP20, the DSP20 processes the data so that the data can be reproduced. While the processing by the DSP20 is being carried out, the display control section 54 successively fetches sub-code data from the pack data separating section 22C of the DSP20 (step S1).

After the step S1 is carried out, the display control section 54 executes the prespecified processing for computing the reproducing position data based on the fetched sub-code data (step S2). The method as described below may be employed for the processing above.

Namely, the display control section 54 calculates a total number of frames reproduced from a point of time when the reproduction of music or the like is started until the current tracking time from the fetched sub-code data. More specifically, the display control section 54 detects the time information included in the fetched sub-code data, such as minute (min), second (sec), and a number of frames (Fn) to calculate a total number of frames by the equation shown below;

$$N = (Min \times 60 \times 75) + (Sec \times 75) + Fn \quad (1)$$

Then, the total number of frames is divided by a coefficient K to obtain an odd A indicating the current reproducing position.

The coefficient K is a preset value defined for each optical disk. In case of a CD, the coefficient K is set to 135 because the number of frames per second is 75 and a rotating speed of the analog record player is 33 rpm (0.55 turn per second).

After the reproducing position data is computed in step S2, the display control section 54 displays the reproducing position by lightening the light emitting element at a position corresponding to the current reproducing position data which is displayed in the clockwise direction from the top central position (corresponding to twelve o'clock in a case of a clock) of the reproducing position display section 132A of the reproducing state display section 132 as a reference point (Step 3). As the reproducing position data changes in succession during reproduction, the light emitting elements light up in succession in the clockwise direction, and it seems that something lightening rotates along a substantially circular virtual orbit on the reproducing position display section 132A.

When the cue button 117 of the operational instruction section 110 is pressed down by the user (FIG. 1), the operational instruction recognizing section 51 detects an operation signal in response to the operation for pressing. Then the operational instruction recognizing section 51 recognizes the instruction for a cue point corresponding to the operation signal (Step4).

When the operational instruction recognizing section 51 recognizes the instruction for the cue point in step S4, the operational instruction recognizing section 51 outputs an output signal to the display control section 54. The display control section 54 determines that the reproducing position data calculated at the point of time when the output signal is detected is the cue point data (step S5).

The display control section 54 then displays the cue point by lightening the light emitting element at a position away from the top central position (corresponding to twelve o'clock) as the reference point on the cur point display section (FIG. 2) to display the cue point (step S6).

The operation for changing the reproducing state of the information reproducing unit 1 is now explained with reference to FIG. 1, FIG. 3 and the flowchart shown in FIG. 6. It is assumed herein that the pack data corresponding to the cue point is recorded in the cue memory 42, for instance, in step S4.

While the DSP20 is reproducing the data signal from the reading section 10, the operational instruction recognizing section 51 of the control section 50 judges whether the touch sensor 121 of the reproducing state changing section 120 is pressed down by the user operation with a prespecified pressure or not (step S11). Namely the operational instruction recognizing section 51 judges whether the touch sensor 121 is pressed down by the user and an operation signal generated in response to this touching operation has been detected or not. When it is determined that the touch sensor 121 has not been pressed with a prespecified pressure, namely in the case of "NO", the operation for changing the reproducing state is terminated. Therefore the reproducing state of the DSP 20 is not changed and continues as it is.

When it is determined as "YES" in step S11, the operational instruction recognizing section 51 further judges whether the quick return button 115 (FIG. 1) of the operational instruction section 110 is ON or not (step S12). Namely, the operational instruction recognizing section 51 judges whether the contents of the operational instruction generated in response to the operation of pressing the touch sensor 121 is to stop or start the processing for data reproduction, or to change the reproducing position.

When it is determined as "YES" in step S12, namely when it is determined that the contents of the operational instruction generated in response to the cue operation of pressing the touch sensor 121 is to change the reproducing position, the operational instruction recognizing section 51 outputs to the cue memory read control section 52B2 an output signal for reading out the pack data recorded in the cue memory 42. Then the cue memory read control section 52B2 outputs a control signal to the DSP 20. Subsequently, DSP20 stops the processing for data reproduction, and provides controls so that the pack data is read out from the cue memory 42 (step S13).

After the step S13, the operational instruction recognizing section 51 fetches the operating range detected by the angular speed detecting element 120A of the reproducing state changing section 120, and the operational instruction recognizing section 51 judges whether the reproducing state changing section 120 has been rotated by the user operation or not (stepS14). If the operational instruction recognizing section 51 determines that the reproducing state changing section 120 has not been rotated (NO), the state in which the processing for data reproduction is stopped in step S13 is continued with the system control shifted to step S17.

When a result of determination in step S14 is YES, the operational instruction recognizing section 51 judges depending on an operating range of the reproducing state changing section 120 whether the rotation of the reproducing state changing section 120 is in the forward direction (clockwise) or not (step S15).

When a result of determination in step S15 is YES, the cue memory read control section 52B2 outputs a control signal to the output speed adjusting section 22B of the DSP20. Then the DSP20 reads out the pack data recorded in the cue memory 42, and reproduces the data in the forward direction from the cur point at the reproduction speed corresponding to the rotating speed of the reproducing state changing section 120 detected by the angular speed detecting element 120A and recognized by the operational instruction recognizing section 51 according to an operating range of the reproducing state changing section 120 (step S16).

After the step S16, the operational instruction recognizing section 51 judges whether the touch sensor 121 is still being pressed down by the user or not (step S17). When a result of the determination is "YES", the control section 50 again executes the operations from step S14. Namely when it is determined that the touch sensor 121 is still being pressed by the user, operations in the steps 14 to 16 are repeatedly executed.

While the operations from the step S14 to step S16 is repeatedly executed, if a result of the determination in step S15 is NO, namely when the reproducing state changing section 120 has been rotated not in the forward direction, but in the reverse direction (in the counterclockwise direction), the cue memory read control section 52B2 outputs a control signal to the read address controller 22E (FIG. 3) and also to the output speed adjusting section 22B (FIG. 3). Then the DSP 20 reads out the pack data recorded in the cue memory in the reverse direction. Further the DSP 20 reproduces data from the cue point in the reverse direction at the reproducing speed corresponding to the rotating speed detected by the angular speed detecting element 120A and recognized by the operational instruction recognizing section 51 and according to a rotation of the reproducing state changing section 120 (step S18).

Namely, when the forward reproduction is carried out in step S16 and the reverse reproduction is carried out in step S18, the scratch playing method is carried out in which the so-called scratch sounds (such as "bang" or "squeak") are generated.

Again in step S12, when a result of the determination is NO, namely when the contents of the processing for changing the reproducing state with the touch sensor 121 is to stop or start the processing for data reproduction, the ring memory read control section 52B1 outputs a control signal to the output speed adjusting section 22B of the DSP 20 (FIG. 3). Then the DSP20 gradually reduces the reproducing speed to zero % at the reproducing speed reduction rate in the reproduction stopping step set in the speed adjusting section 112B of the operational instruction section 110 and recognized by the operational instruction recognizing section 51 (step S19).

After step 19, while the state where the touch sensor 121 is pressed down by the user in step S17 still continues, the operations in the step S14 and on are repeatedly executed. In this case, in step S16 and step S18, the ring memory read control section 52B1 makes the DSP 20 read out the pack data recorded in the ring memory 41 so that the data reproduction is restarted from the position where the data reproduction processing is stopped in step S19.

When a result of determination is step S17 is NO, namely when it is determined that the touch sensor 121 has been released from the pressed state and is not pressed by the user, the reproduction control section 52 outputs a control signal to the output speed adjusting section 22B. The DSP20 sets the reproducing speed to 100% and starts data reproduction at the start-up speed set in the speed adjusting section 112B (FIG. 1) of the operational instruction section 110 and recognized by the operational instruction recognizing section 51. (Step S20)

When it is determined in step S12 that the quick return button 115 of the operational instruction section 110 is ON, the DSP20 reads out the pack data recorded in the cue memory 42 and subjects the read-out pack data to data reproduction. If it is determined in the step S12 that the quick return button 115 of the operational instruction section 110 is OFF, the DSP20 reads out the pack data recorded in the ring memory 41 and subjects the read-out pack data to data reproduction.

[Effects of the Embodiments]

The information processing unit 2 according to the embodiment comprises the reading section 10 as a recording medium for reading the information recorded in the optical disk; DSP20 as an information processing section for processing the information read by the reading section 10; operational instruction recognizing section 51 as a positional instruction recognizing section for recognizing an instruction for a prespecified position of the information, and a display section for displaying, when a positional instruction is recognized by the operational instruction recognizing section 51, the instructed position corresponding to the instructed information.

In this embodiment, the reading section 10 reads out the information recorded in the optical disk and outputs a read signal. The DSP 20 detects the read signal and processes it as reproducible. The operational instruction recognizing section 51 recognizes an instruction for a prespecified position of the information. Then the display section displays the instructed position corresponding to the instructed information. With this operation, the prespecified instructed position can easily and accurately be recognized. In addition, for instance, when the information processing unit 2 is employed in a record player, the player can recognize the prespecified instructed position. Then, for instance, by manually matching a position of a reproduction needle as a reproducing position and the instructed position, reproduction from a desired position or repetitive reproduction can be carried out. Further setting the prespecified instructed position can easily be carried out even during reproduction.

In the information processing unit 2 according to the embodiment, the prespecified position is a cue point as a processing start position for repetitively reproducing the information at the same position. Because of this feature, a cue point can be recognized from the display section. By using the function to return the reproducing position to the cue point concurrently, the reproducing position can be changed to the recognized cue point.

The display section comprises a reproducing position display section 132A, a cue point position display section 132B, and a display control section 54. When the cue button 117 of the operational instruction section 110 is pressed down by the user, the operational instruction recognizing section 52 detects an operation signal generated in response to pressing of the cue button 117, an instruction for the prespecified cue point is recognized. Further, after the instruction is recognized, the display control section makes the cue point display section 132B display the instructed cue point. Because of the configuration, the cue point can be recognized from the cue point position display section 132B. Then the player can determine whether a cue point has been registered or not. When the reproducing state changing section 120 is operated by the user or the like, the reproducing position is changed to the cue point. Therefore the reproducing position can be changed to the cue point recognized by the display section.

In the information processing unit 2 according to the embodiment, the display section displays a reproducing position as a processing position for information according to the process of the processing by the DSP 20, and displays, when an instruction for a prespecified position is recognized by the operational instruction recognizing section 51, the instructed position based on the reproducing position.

In the embodiment, the display section displays a reproducing position of the information according to the progress of processing by the DSP 20. In addition, when an instruction for a prespecified position is recognized by the operational instruction recognizing section 51, the display section displays the instructed position based on the reproducing position. Because of this feature, relative positions of the reproducing position and the instructed position can accurately be recognized.

The display control section 54 makes the reproducing position display section 132A display the reproducing position. When the cue button 117 of the operational instruction section 110 is pressed by the user, the operational instruction recognizing section 51 detects an operation signal generated in response to the pressing operation, and recognizes an instruction for a prespecified cue point. After the instruction is recognized, the display control section 54 makes the cue point position display section 132B display the cue point instructed based on the reproducing position. Because of this feature, the reproducing position can be recognized from the reproducing position display section 132A and the cue point from the cue point position display section 132B. Especially because the reproducing position and the cue point are displayed in different display sections respectively, relative positions of the reproducing position and the cue point can easily be recognized. When the reproducing position is changed by operating the reproducing state changing section 120, as the relative positions can be recognized, it is possible to employ various playing techniques such as finely changing a position to return to the cue point or changing the returning speed (rotating speed).

In the information processing unit 2 according to the embodiment, the information recorded in the optical disk includes reproduced data as data and the sub-code as positional data relating to the reproduced data, and the display section displays a reproducing position of the reproduced data based on the sub-code data, and displays, when an instruction for a prespecified position is recognized by the operational instruction recognizing section 51, the instructed position based on the sub-code data for the reproducing position.

In the embodiment, the information recorded in the optical disk includes reproduced data and sub-code data as positional information relating to a position of the reproduced data. The display section displays a reproducing position of the reproduced data based on the sub-code. When an instruction for a prespecified position is recognized by the operational instruction recognizing section 51, the display section displays an instructed position based on the sub-code data for the reproducing position. Because of this feature, the reproducing position and the instructed position can accurately be displayed, and the reproducing position and the instructed position ca be recognized more accurately.

In the information processing unit 2 according to the present invention, the display section provides a prespecified display along a virtual orbit, fixes an instructed position on the virtual orbit, and displays in the moving state the reproducing position along the virtual orbit.

In the embodiment, the display section provides a prespecified display along a virtual orbit. The display section fixes an instructed position on a virtual orbit, and displays in the moving state the reproducing position along the virtual orbit. Because of this feature, the reproducing position and the instructed position can easily be recognized.

The display control section 54 makes the reproducing state display section 132 having a substantially circular virtual orbit provide a prespecified display. Then the display control section 54 fixes a cue point as an instructed position on the virtual orbit of the cue point position display section 132B, and also displays in the moving state the reproducing position along the virtual orbit of the reproducing position display section 132A. Because of this feature, by displaying the reproducing position and the cue point along a substantially circular virtual orbit, relative positions of the reproducing position and the cue point can easily be recognized. Further as the operating direction of the jog dial 121 and the direction of the virtual orbit of the reproducing state display section 132 are in the substantially same direction, the reproducing position and the cue point can be matched to each other by recognizing relative positions of the reproducing position and the cue point and then operating the reproducing state changing section 120.

The display program according to the present invention makes the computing section control display operations of the information processing unit 2. Because of this feature, the applicability of the present invention can substantially be improved by using, for instance, a general-purpose computer.

The recording medium according to the present invention records therein the display program so that the program can be read out by the computing section. Because of this feature, as the display program for controlling display operations of the information processing unit 2 is recorded in a recording medium, the program can easily be handled, whereby the applicability of the present invention can substantially be improved.

The computing section as defined herein includes a personal computer, a plurality of computers combined into a network, and circuit board with a plurality of electric components such as an IC or a CPU for a microcomputer or the like incorporated therein.

The information reproducing unit 1 according to the embodiment comprises the information processing unit 2, and the reproducing section 30 for fetching and reproducing the information processed by the information processing unit 2. Because of this feature, the information processed appropriately can be reproduced by the reproducing section 30.

The information processing unit 2 according to the present invention comprises the reading section 10 for reading information recorded in an optical disk; the DSP 20 for processing the information read by the reading section 10, the reproducing state changing section 120 as a change instruction recognizing section for recognizing an instruction for changing the information processing state in the DSP 20; the quick return button 115 as a change condition selecting section for selecting at least one of the processing details for starting or stopping the information processing and the processing details for changing a reproducing position as the information processing position; and the reproduction control section 52 as a processing control section for changing the processing state in the DSP 20, when a change instruction for changing the information processing state is recognized by the reproducing state changing section 120, based on the processing details selected by the quick return button 115.

In the embodiment, the reading section 10 reads the information recorded in an optical disk, and outputs a read signal. The DSP 20 detects the read signal and processes the signal as reproducible. Then the quick return button 115 selects at least one of the processing details for starting or stopping the information processing and the processing details for changing the reproducing position of the information. When the reproducing state changing section 120 recognizes a change instruction for changing the information processing state in the DSP 20, the reproduction control section 52 changes the information processing state in the DSP 20 based on the processing details selected with the quick return button 115. Because of the feature, as the processing details for starting or stopping the processing and the processing details for changing the reproducing position are previously set as change instructions for changing the processing state in the reproducing state changing section 120, operating components can be simplified with the operability of the information reproducing unit 1 improved.

When the touch sensor 121 of the reproducing state changing section 120 is pressed or touched, the reproducing state changing section 120 recognizes the two types of operating instructions; one for starting or stopping the processing for data reproduction and another for changing the reproducing position. Because of the configuration, when the touch sensor 121 is operated, the processing for starting or stopping data reproduction and the processing for changing the reproducing position can be executed, whereby the operability of the information reproducing unit 1 can be improved.

The information processing unit 2 according to the embodiment described above comprises the reading section 10 for reading the information recorded in the optical disk; the DSP20 for processing the information read out by the reading section 10; the reproducing state changing section 120 for recognizing an operational instruction for changing the information reproducing position in the DSP20; a change condition setting section for setting the processing details for moving the reproducing position of the information forward or backward and also the processing details for moving the reproducing position of the information to a cue point as a processing start position previously set; and the reproduction control section 52 for changing the reproducing position in the DSP10 based on the processing details set by the change condition selecting section when the reproduce state change section 120 recognizes the operational instruction for changing the reproducing position of the information.

In this embodiment, the reading section 10 reads the information recorded in an optical disk and outputs a read signal. The DSP 20 detects the read signal and processes it as reproducible. Then the change condition setting section sets the processing details for moving the reproducing position of the information forward or backward and the processing details for moving the reproducing position of the information to the cue position previously set. In this step, when the reproducing state changing section 120 recognizes an operational instruction for changing the reproducing position of the information in the DSP, the reproduction control section 52 changes the reproducing position in the DSP 20 based on the processing details set by the change condition setting section. With this configuration, the processing for moving the reproducing position forward and backward and the processing for changing the reproducing position to the cue point are previously set as operational instructions for changing the processing state changing section 120, whereby members required for the operation are reduced and simplified with the operability of the information reproducing unit 1 improved.

The change condition setting section here corresponds to the jog mode button 112A and the quick return button 115. When both the jog mode button 112A and the quick return button 115 are ON, the change condition setting section sets the processing details for moving the reproducing position of the reproduced data to the cue point and also sets the processing details for moving the reproducing position of the reproduced data forward or backward according to the operating rage detected by the angular speed detecting element 120A of the reproducing state changing section 120 described hereafter. The reproducing state changing section 120 recognizes the two types of operational instructions; one for changing the reproducing position to the cue point in response to the operation of pressing or touching the touch sensor 121 or to rotation of the touch sensor 121, and another for the processing for changing the reproducing position backward or forward. Therefore, the two types of processing; one for changing the reproducing position to the cue point, and the other for the processing for changing the reproducing position backward or forward can be performed by operating the touch sensor 121, whereby the operability of the information reproducing unit 1 can be improved. Further the play method such as scratching can be carried out after the reproducing position is changed to the cue point, so that various playing methods can be employed even after the reproducing position is changed.

The information processing unit 2 according to the above embodiment comprises the operational instruction recognizing section 51 as a positional instruction recognizing section for recognizing the instruction of the cue point where the information is to be processed again at the same position, and the reproduction control section 52 changes the reproducing position of DSP20 to the cue point based on the instruction recognized by the operational instruction recognizing section 51.

In this embodiment, the operational instruction recognizing section 51 recognizes the instructions from the cue point to process repeatedly the information at the same position. Then the reproduction control section 52 changes the reproducing position of DSP20 to the cue point based on the instruction recognized by the operational instruction recognizing section 51. With this configuration, the reproducing position can be changed to the cue point appropriately based on the instruction recognized by the operational instruction recognizing section 51.

In the information processing unit 2 according to the embodiment, the information recorded in the optical disk includes reproduced data and sub-code data relating to the position of the reproduced data and the information processing unit 2 comprises the cue point 42 as a position recording section for recording information at the cue information and those in front on and at the back of the cue point when an instruction for a cue point is recognized by the operational instruction recognizing section 51, and the reproduction control section 52 changes the reproducing position of the DSP20 to the cue point based on the sub-code data included in the information recorded in the cue memory 42.

In the embodiment, the information recorded in the optical disk includes reproduced data and sub-code data relating to the position of the reproduced data. The cue memory 42 records information at the cue point information and those in front of and at the back of the cue point when the operational instruction recognizing section 51 recognizes the instructions from the cue point. Then the reproduction control section 52 changes the reproducing position of DSP20 to the cue point based on the sub-code data of the information recorded in the cue memory 42. With this configuration, the reproducing position can be changed more appropriately based on the sub-code data of the cue point recorded in the cue memory 42. In addition, the cue memory 42 can record therein not only information at the cue point information but also those in front of and at the back of the cue point, so that the playing method such as scratching can be employed after the reproducing position is changed.

In the information processing unit 2 according to the embodiment, the reproduced data for the information recorded in the cue memory 42 is processed by the DSP 20 after the reproducing position in the DSP 20 is changed to the cue point. With this configuration, the reproduced data can be reproduced immediately after the reproducing position is changed.

In the information processing unit 2 according to the embodiment, the reproducing state changing section 120 detects whether the operation of pressing down or touching operation has been carried out or not, and the reproduction control section 52 makes the DSP 20 move the reproducing position to the cue point when the reproducing state change section 120 detects the operation of pressing down or touching it.

In the embodiment, the reproducing state changing section 120 comprises the touch sensor 121 and detects whether the operation of pressing down or the touching it has been done or not. The reproduction control section 52 makes the DSP 20 move the reproducing position to the cue point when the touch sensor 121 detects the operation of pressing down or the touching it. With this configuration, an instruction for changing the processing state or for moving the reproducing position to the cue point can be recognized with the simple configuration, whereby the operability of the information reproducing unit 1 can be improved.

The information processing unit 2 according to the above embodiment comprises the reading section 10 for reading the information recorded in the optical disk; DSP20 for processing the information read by the reading section 10; the operational instruction recognizing section 51 for recognizing the instructions from the cue point to repeatedly process the information at the same position; the cue memory 42 for recording therein the information at the cue point as well as those in front of and at the back of the cue point when the operational instruction recognizing section 51 recognizes the instruction from the cue point; the reproducing state changing section 120 for recognizing the change instruction of changing the reproducing position at DSP20; and the reproduction control section 52 for changing the reproducing position of DSP20 to the cue point based on the information recorded in the cue memory 42 when the reproducing state changing section 120 recognizes the change instruction changing the reproducing position.

In this embodiment, the reading section 10 reads out the information recorded in the optical disk and outputs a read signal. The DSP 20 detects the read signal and processes it as reproducible. The operational instruction recognizing section 51 recognizes the instructions from the cue point to process repeatedly the information at the same position. Then the cue memory 42 records the information at the cue point as well as those in front of and at the back of the cue point. The reproducing state changing section 120 recognizes the change instruction indicating to change the reproducing position at DSP20. The reproduction control section 52 changes the reproducing position of DSP20 to the cue point based on the information recorded in the cue memory 42. With this configuration, the cue memory 42 records therein information at the cue point information and also those in front of and at the back of the cue point, so that, in addition to the function for changing the reproducing position to the cue point, also the function for changing the reproducing direction at the cue point, whereby the operability of the information reproducing unit 1 can be improved.

In the information processing unit 2 according to the embodiment, the information recorded in the optical disk includes reproduced data and sub-code data relating to a position of the reproduced data, and the memory 42 records information at the cue point and also those in front of and at the back of the cue point, and the reproduction control section 52 changes the reproducing position of DSP20 based on the sub-code data recorded in the cue memory 42.

In the embodiment, the information recorded in the optical disk includes reproduced data and the sub-code data relating to the position thereof. The cue memory 42 records therein information at the cue point and also those in front of and at the back of the cue point and sub-code data for the information. The reproduction control section 52 changes the reproducing position of DSP20 based on the sub-code data recorded in the cue memory 42, whereby change of the reproducing position and the change in the reproducing direction can be carried out appropriately.

In the information processing unit 2 according to the embodiment, the reproduction control section 52 makes the DSP 20 process the information data recorded in the cue memory 42 when the reproduction control section 52 changes the reproducing position to the cue point. With this configuration, when the reproducing position is changed, the data reproduction at the cue point can immediately be carried out, and when the reproducing direction is changed at the cue point to the forward direction or the reverse direction, the changing operation can immediately be performed with also the data reproduced immediately.

In the information processing unit 2 according to the embodiment, the reproducing state changing section 120 is rotatably provided and detects the rotating direction, while the reproduction control section 52 moves the reproducing position of DSP 20 backward or forward according to the rotating direction detected by the reproducing state changing section 120.

In the embodiment, the reproducing state changing section 120 has a substantially disk-shaped form and is rotatably provided. The reproducing state changing section 120 comprises the angular speed detecting element 120A and detects the operating range (rotating direction, rotating speed, a number of rotations) thereof. Then the reproduction control section 52 moves the reproducing position in the DSP 20 backward or forward according to the operating range detected by the reproducing state changing section 120. With this configuration, the operating feeling similar to that when the reproduced sounds are reproduced by manually controlling an analog record such as an LP can be provided. The scratch and the like playing method can be employed even after changing the reproducing position, so that the various playing methods can be implemented.

The information processing unit 2 according to the embodiment comprises the read control section 53 as a read control section for controlling operations of the reading section 10, and the read control section 53 controls the reading section 10 to read information at positions adjacent to the changed reproducing position when, in the reproducing control section, a change of the reproducing position in the PSD 20 is carried out.

In the embodiment, the read control section 53 controls operations of the reading section 10. The read control section 53 controls the reading section 10 to read the information at positions adjacent to the changed reproducing position when the change of the reproducing position of DSP 20 is carried out at the reproduction control section 52. In the embodiment, when the reproducing position of DSP 20 is changed, the reproduced data corresponding to the cue point recorded in the cue memory 42 is reproduced. Namely, when the reproduced data recorded at the cue memory 42 becomes short during the reproducing process, the DSP 20 continues the reproduction processing based on the information read by the reading section 10.

The information processing program according to the embodiment makes the computing section execute the information processing operation for the information processing unit 2. With this feature, the applicability of the present invention can substantially be improved, for instance, by using a general-purpose computer.

The recording medium according to the present embodiment records therein an information processing program so that the program can be read by a computing section. Because of this feature, the information processing program for executing the information processing operation in the information processing unit 2 is recorded in a computer-readable form, whereby treatment of a program is easy and the applicability of the present invention can substantially be improved.

In the information reproducing unit 1 according to the embodiment, the DSP20 processes the music data recorded in the optical disk into a reproducible form, and the reproducing state changing section 120 is a rotating body rotatably provided, and detects an operation of pressing or touching the rotating body to recognize an operational instruction for changing the reproducing position so that musical data can be made reproducible; the reproduction control section 52 changes the reproducing position of DSP20 to the pre-dominated position by the pressing down or the touching operation detected by the reproducing state changing section 120; the reproduction control section 52 changes the reproducing position of DSP20 backward or forward by the rotation operation detected by the reproducing state changing section 120; and the reproducing section 30 outputs the information processed at DSP 20 as sound.

In the embodiment, the DSP20 processes the music data recorded in the optical disk reproducible. The reproducing state changing section 120 is a rotating body rotatably provided. The reproducing state changing section 120 detects the rotation operation thereto and the pressing down or the touching operation and recognizes the operational instruction for changing the reproducing position so that the musical data can be reproduced. The reproduction control section 52 changes the reproducing position of DSP20 to the position previously stored in response to the operation of pressing down or the touching it. Further the reproduction control section 52 changes the reproducing position of DSP20 backward or forward by the rotation operation detected by the reproducing state changing section 120. The reproducing section 30 outputs the information processed at DSP 20 as sounds. Because of the feature, the reproduction control section 52 can process two types of processing based on the operation at the reproducing state changing section 120 and the number of operating member can be reduced, whereby the size of the information reproducing unit 1 can be reduced. The reproduction control section 52 can execute the two types of processing for changing the reproducing position of DSP20 to the position previously stored and for moving the reproducing position backward or forward, whereby the operability of the information reproducing unit 1 can be improved.

As described above, the information reproducing unit 1 can be functioned as a disk player for a disk jockey (DJ). Namely the player can play with operating feelings substantially similar to that in playing dance music or the like with a record player. In addition, the player can easily conduct the scratch, the pitch bend (changing the reproducing speed), the back cueing (changing the reproducing position to the cue point) or combination of the playing methods by executing with a single hand the rotation operation or the pressing down operation to the reproducing state changing section 120 while listening to the music reproduced by the information reproducing unit 1.

[Variants of the Embodiment]

The prevent invention was described above with reference to a preferred embodiment above, but the present invention is not limited to this embodiment, and various types of improvement and changes are possible without departing from the spirit of the present invention.

In the information processing unit 2 according to the embodiment described above, the quick return button 115 is used to select the processing details. Description of the embodiment assumes a case in which, when an instruction for changing is recognized by the touch sensor 121, the reproduction control section 52 changes the processing state or the processing position by the DSP 20, but the present invention is not limited to this configuration. For instance, the following configuration is allowable in which the quick return button 115 is not provided.

Namely, when an instruction for changing is recognized by the touch sensor 121, the reproduction control section 52 makes the DSP 20 execute at least either the processing for starting or stopping the information processing or the processing for changing the processing position of the information. With the configuration, for instance, by setting the reproduction control section 52 so that either one of the two types of processing is executed, the operation by a player can quickly be carried out without requiring the quick return button 115. Further by previously setting the reproduction control section 52 so that the processing for starting or stopping the information processing and the processing for changing a reproducing position of the information are executed alternately, the player can carry out the two types of processing alternately by operating the touch sensor 121.

When an instruction for changing is recognized by the touch sensor 121, the reproduction control section 52 makes the DSP 20 execute both the processing for changing the reproducing position of the processing to a preset processing start position and the processing for changing the processing position of the information forward or backward. With the configuration, for instance, by previously setting the reproduction control section 52 so that the two types of processing described above are executed, the player can carry out operations for playing without requiring the jog mode button 112A and the quick return button 115. Further by setting the reproduction control section 52 so that the processing for changing the processing section of the information to a processing start position previously set and the processing for moving the processing position of the information forward or backward are executed alternately, the player can employ various ways of replaying by operating the touch sensor 121.

The information reproducing unit 1 comprises the information processing unit 2 not having the quick return button 115 described above and the reproducing section 30 for fetching and reproducing the information processed by the information processing unit 2. The touch sensor is a rotatable body, and recognizes an instruction for changing the processing position to make the musical data reproducible by detecting the rotating operation or the pressing or the touching operation. When it is detected that the change from the not pressed or not-touched state to the pressed or touched state occurs in the touch sensor 121, the reproduction control section 52 changes the processing position forward or backward by the DSP 20 to the previously stored position. After the pressing operation or the touching operation has been detected by the touch sensor 121, when the rotating operation is detected thereby, the reproduction control section 52 moves the processing position by the DSP 20 in the rotating direction of the touch sensor 121. With the configuration as described above, even though the touch sensor 121 is not provided, the player can move the reproducing position to a cue point by pressing or touching the touch sensor 121, and can perform scratching at the cue point, to which the reproducing position has been moved, by rotating the touch sensor 121. Namely, the player can carry out a complicated operation such as, for instance, a combination of back cueing (change of the reproducing position to a cue point) and scratching even hearing a music piece reproduced by the information reproducing unit 1 and operating the touch sensor 121 with a single hand.

The above description assumes that the information read by the reading section 10 is that recorded in an optical disk, but the present invention is not limited to this case. For instance, the configuration is allowable in which the information reproducing unit according to the present invention may be connected to a computer with a LAN cable or the like to fetch information through the network, and also the configuration is allowable in which information is fetched from an external serer with the information stored therein by means of radio communication. When the radio communication is employed, for instance, a radio communication unit incorporated in the information reproducing unit 1 or a mobile telephone or the like connected to the information reproducing unit 1 and executing radio communication with an external server functions as the reading section 10.

The above description assumes that the information read by the reading section 10 is audio information, but the present invention is not limited to this configuration. In addition to the audio information, for instance, image information and character information or the like may be employed.

The description of the embodiment above assumes a case that the information read by the reading section 10 includes reproduced data and sub-code data as positional information relating to a position of the reproduced data, but the present invention is not limited to this configuration. The other configuration is allowable in the present invention.

The description of the embodiment above assumes a case where a CD or a DVD is used as an optical disk, but the present invention is not limited to this configuration. Other types of recording media such as an MO or a memory card capable of storing information therein may be employed in the present invention.

The Description of the embodiment above assumes the configuration in which the display control section 54 displays a cue point as an instructed position at a fixed prespecified position in the cue point position display section 132B and moves the reproducing position along a virtual orbit of the reproducing position display section 132A, but the present invention is not limited to this configuration. For instance, the configuration is allowable in which the reproducing position is displayed at a fixed prespecified position on the reproducing position display section 132A and the cue point is moved along a virtual orbit of the cue point position display section 132B. Even with the configuration as described above, the player can accurately recognize relative positions of the reproducing position and the cue point.

The description of the embodiment assumes the configuration in which light emitting elements are arrayed along a substantially circular virtual orbit in the reproducing position display section 132A and the cue point position display section 132B each in the reproducing state display section 132, but the present invention is not limited to this configuration. For instance, the light emitting elements may be arrayed along a substantially linear virtual orbit. Further the configuration is allowable in which the reproducing position display section 132B and the cue point position display section 132B are displayed on one virtual orbit. A plurality of virtual orbits may be provided like concentric circulars or in the spiral form. When a plurality of concentric virtual orbits or spiral form of virtual orbits are provided, relative positions for the reproducing position and the cue point can be recognized more accurately.

When a plurality of concentric virtual orbits or spiral form of virtual orbits are provided, the configuration is allowable in which, if the reproducing position and the cue point are away from each other in a direction orthogonal to a circumferential direction of the virtual orbit, the reproducing position and cue position are displayed differentially. For instance, the reproducing position and the cue position may be displayed with different colors respectively, or only either one of the reproducing position and the cue position may be blinked. When the display method as described above is employed, even if a plurality of cue points are registered, relative positions for the reproducing position and the plurality of cue points can be recognized accurately.

In the embodiment described above, the touch sensor 121 recognizes the reproducing state by the DSP 20 by detecting whether the touch sensor 121 is pressed down or touched by a user or not. In relation to this function, the configuration is allowable in which the touch sensor 121 is divided to a plurality of blocks, and the reproduction control section makes the DSP 20 change the reproducing position, when any particular position of the touch sensor 121 is pressed down or touched, to the cue point corresponding to the particular block.

Figure 7:
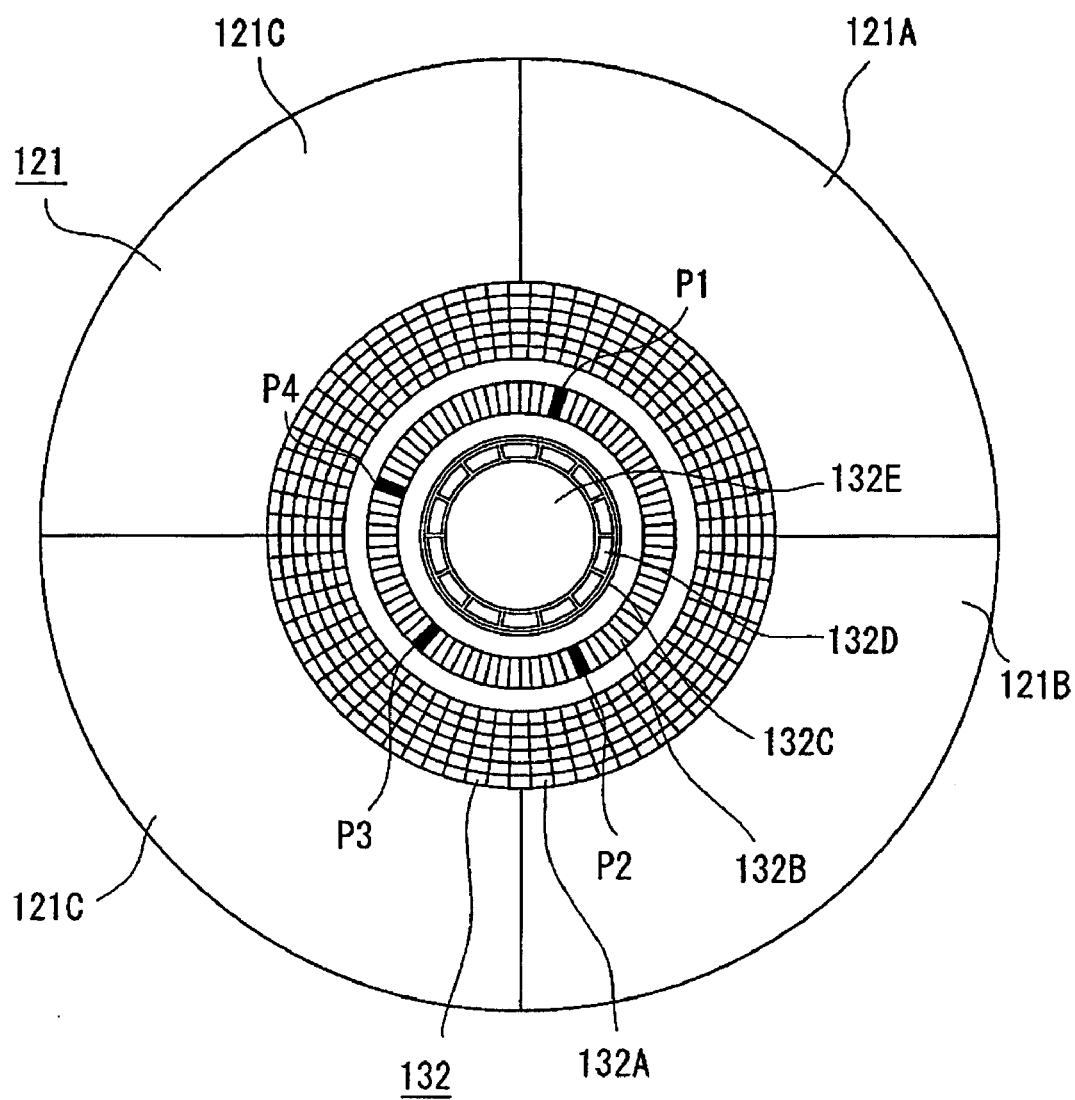
FIG. 7 is a view showing a variant of the embodiment.

More specifically, as shown in FIG. 7, the touch sensor 121 is divided to four blocks of blocks 121A, 121B, 121C, and 121D. With this configuration, when a plurality of cue points P1, P2, P3, and P4 are registered, the reproduction control section makes the DSP 20 change the reproducing position based on a cue point corresponding to a particular block pressed or touched. The number of divided blocks is not limited to four as shown in FIG. 7, and more blocks may be arranged. With the configuration, when a plurality of cue points are registered, the player can change the reproducing position to any desired cur point.

Further the configuration is allowable in which the reproducing position display section 132A, cue point position display section 132B, and touch sensor 121 are monolithically provided with a form like a touch panel. With the configuration, the player can change the reproducing position to a desired cur point only by touching a displayed cue point, whereby the operability can be improved. Further with the configuration as described above, even when a plurality of cue points is registered, manipulation thereof is very easy.

The description of the embodiment above assumes the configuration in which the reproducing state changing section 120 recognizes the processing details of the reproducing state (the processing for stopping or starting reproduction, and processing for changing the reproducing position), and the processing details for the reproducing position (the processing for moving the processing position forward or backward, and the processing for moving the processing position to the cue point), but the present invention is not limited to this configuration. For instance, the configuration is allowable in which the reproducing state changing section 120 can recognized further different instructions. With the configuration, the size of the information reproducing unit 1 can further be reduced.

The description of the embodiment above assumes the configuration in which a cue point is recorded in the cue memory 42 when the cue button 117 is pressed down and the cue point is displayed on the cue point position display section 132B, but the present invention is not limited to this configuration. The configuration is allowable in which a specific position is instructed with a different operational component and the instructed position is displayed in the display section.

The description of the embodiment above assumes the configuration in which the information reproducing unit 1 comprises the quick return button 15, but the present invention is not limited to this configuration. The configuration is allowable in which the quick return button 115 is not provided. With the configuration in which information in front of and at the back of the cue point can be recorded in the cue memory 42, in addition to the conventional type of cueing function, also scratching at the cue point can be carried out, which enables various playing methods with a simple configuration.

The description of the embodiment assumes the information reproducing unit 1, but the present invention is not limited to this configuration. For instance, the configuration is allowable in which software is installed in a computer.

The operations executed by the information reproducing unit 1 to display the reproducing position and the cue point are not limited to those shown in the flow chart in FIG. 5. Further the operations executed by the information reproducing unit 1 to change the reproducing state is not limited to those shown in the flow chart shown in FIG. 6.

What is claimed is:

1. An information processing unit comprising:
   a reading section for reading information recorded in a recording medium;
   an information processing section for processing the information read by this reading section;
   a positional instruction recognizing section for recognizing an instruction for a prespecified position in said information;
   a change instruction recognizing section recognizing a change instruction to change a reproducing position of the information of the information processing section when a rotary operation is detected;
   a processing control section for changing the reproducing position of the information processing section when the change instruction is recognized by the change instruction recognizing section; and
   a display section for displaying an instructed position corresponding to the instructed information on a virtual orbit simulating a movement of the recording medium along a rotary operation direction of the change instruction recognizing section when the positional instruction is recognized by said positional instruction recognizing section,
   wherein the display section provides a prespecified display along said virtual orbit, fixes the instructed position on said virtual orbit, and displays in the moving state a processing position along said virtual orbit,
   wherein said virtual orbit includes a plurality of concentric virtual orbits, and
   wherein, when the processing position and the instructed position are away from each other in a direction orthogonal to a circumferential direction of said virtual orbit, said display section displays said processing position and said instructed position in different display forms respectively.

2. The information processing unit according to claim 1, wherein said prespecified position is a processing start position for starting processing of the information at the same position repetitively.

3. The information processing unit according to claim 1, wherein said display section displays said processing position of the information according to the progress of processing by said information processing section, and displays, when an instruction for said prespecified position is recognized by said positional instruction recognizing section, said instructed position based on said processing position.

4. The information processing unit according to claim 1, wherein the information recorded in said recording medium includes data and positional information for the data;
   said display section displays said processing position of said data based on said positional information, and displays, when the instruction for said prespecified position is recognized by said positional instruction recognizing section, said instructed position based on said positional information for said processing position.

5. The information processing unit according to claim 1, wherein said virtual orbit has a spiral form.

6. The information processing unit according to claim 1, wherein said display section displays said processing position and said instructed position with different colors respectively.

7. The information processing unit according to claim 1, wherein said display section blinks either one of said processing position and said instructed position.

8. A reproducing unit comprising:
   said information processing unit according to claim 1; and
   a reproducing section for fetching and reproducing the information processed by said information processing unit.

9. An information processing unit comprising:
   a reading section for reading information recorded in a recording medium;
   an information processing section for processing the information read by said reading section;
   a positional instruction recognizing section for recognizing an instruction for a prespecified position in said information;
   a change instruction recognizing section recognizing a change instruction to change a reproducing position of the information of said information processing section when a rotary operation is detected;
   a processing control section for changing said reproducing position of the information processing section when the change instruction is recognized by said change instruction recognizing section; and a display section for displaying an instructed position corresponding to the instructed information on a virtual orbit simulating a movement of said recording medium along a rotary operation direction of said change instruction recognizing section when said positional instruction is recognized by said positional instruction recognizing sections, wherein said display section provides said prespecified display along said virtual orbit, fixes said processing position on said virtual orbit, and displays in the moving state the instructed position along said virtual orbit, wherein said virtual orbit includes a plurality of concentric virtual orbits, and wherein, when the processing position and said instructed position are away from each other in a direction orthogonal to a circumferential direction of said virtual orbit, said display section displays said processing position and said instructed position in different display forms respectively.

10. The information processing unit according to claim 9, wherein said virtual orbit has a spiral form.

11. The information processing unit according to claim 9, wherein said display section displays said processing position and said instructed position with different colors respectively.

12. The information processing unit according to claim 9, wherein said display section blinks either one of said processing position and said instructed position.

13. The information processing unit according to claim 9, wherein said prespecified position is a processing start position for starting processing of the information at the same position repetitively.

14. The information processing unit according to claim 9, wherein said display section displays said processing position of the information according to the progress of processing by said information processing section, and displays, when the instruction for said prespecified position is recognized by said positional instruction recognizing section, said instructed position based on said processing position.

15. The information processing unit according to claim 9, wherein the information recorded in said recording medium includes data and positional information for the data;

said display section displays said processing position of said data based on said positional information, and displays, when the instruction for the prespecified position is recognized by said positional instruction recognizing section, said instructed position based on said positional information for said processing position.

16. A reproducing unit comprising:

said information processing unit according to claim 9; and a reproducing section for fetching and reproducing the information processed by said information processing unit.

* * * * *

UNITED STATES PATENT AND TRADEMARK OFFICE
CERTIFICATE OF CORRECTION

| | | |
|---|---|---|
| PATENT NO. | : 7,115,807 B2 | Page 1 of 1 |
| APPLICATION NO. | : 10/645850 | |
| DATED | : October 3, 2006 | |
| INVENTOR(S) | : Youichi Yamada et al. | |

It is certified that error appears in the above-identified patent and that said Letters Patent is hereby corrected as shown below:

On the title page;

In Item (54) change:
"INFORMATION PROCESSING UNIT, DISPLAY METHOD FOR THE INFORMATION PROCESSING UNIT, PROGRAM FOR THE SAME, RECORDING MEDIUM FOR RECORDING THE PROGRAM THEREIN AND REPRODUCING UNIT"
so as to insert a 4th comma after "THEREIN" to read as:
--INFORMATION PROESSING UNIT, DISPLAY METHOD FOR THE INFORMATION PROCESSING UNIT, PROGRAM FOR THE SAME, RECORDING MEDIUM FOR RECORDING THE PROGRAM THEREIN, AND REPRODUCING UNIT--.

In Item (75), the third inventor's last name, change "Kumura" to be --Kimura--.

Signed and Sealed this

Thirteenth Day of March, 2007

JON W. DUDAS
*Director of the United States Patent and Trademark Office*